United States Patent [19]

Akutsu

[11] Patent Number: 4,789,583

[45] Date of Patent: Dec. 6, 1988

[54] MAGNETIC RECORDING MEDIUM

[75] Inventor: Shigeru Akutsu, Hachioji, Japan

[73] Assignee: Konishiroku Photo Industry Co., Ltd., Tokyo, Japan

[21] Appl. No.: 71,559

[22] Filed: Jul. 8, 1987

Related U.S. Application Data

[63] Continuation of Ser. No. 686,306, Dec. 26, 1984, abandoned.

[30] Foreign Application Priority Data

Dec. 26, 1983 [JP] Japan .................................. 58-244184

[51] Int. Cl.$^4$ ................................................ G11B 5/72
[52] U.S. Cl. .................................... 428/143; 427/128; 427/131; 428/148; 428/336; 428/323; 428/328; 428/329; 428/330; 428/331; 428/425.9; 428/526; 428/694; 428/695; 428/900
[58] Field of Search ................ 427/128, 131; 428/694, 428/695, 900, 323, 325, 328, 329, 330, 425.9, 141, 143, 147, 148, 336, 526, 331, 204

[56] References Cited

U.S. PATENT DOCUMENTS

| | | | |
|---|---|---|---|
| 4,310,599 | 1/1982 | Akashi | 428/413 |
| 4,367,261 | 1/1983 | Miyoshi | 428/694 |
| 4,411,953 | 10/1983 | Miyoshi | 428/900 |
| 4,414,270 | 11/1983 | Miyoshi | 428/900 |
| 4,419,406 | 12/1983 | Isobe | 428/422 |
| 4,452,863 | 6/1984 | Takizawa | 428/423.1 |
| 4,474,843 | 10/1984 | Miyoshi | 428/694 |

*Primary Examiner*—Ellis P. Robinson
*Attorney, Agent, or Firm*—Jordan B. Bierman

[57] ABSTRACT

A magnetic recording medium having a magnetic layer on one side of a support and a backcoat on the other side containing a non-magnetic powder and a binder resin is disclosed. The non-magnetic powder comprises particles having an average size greater than 0.5 $\mu$m and smaller than 2.0 $\mu$m and a maximum size of not more than 5 $\mu$m.

15 Claims, No Drawings

MAGNETIC RECORDING MEDIUM

This application is a continuation of application Ser. No. 686,306, filed Dec. 26, 1984 now abandoned.

This application claims priority of Japanese application No. 244184/1983, filed Dec. 26, 1983.

BACKGROUND OF THE INVENTION

The present invention relates to a magnetic recording medium, more particularly to magnetic tape having a back-coat with improved running property and durability.

Magnetic recording media such as magnetic tape, sheets and disks are extensively used in audio, video and computer applications. Magnetic tape is often used in cassettes. Video recording and playback are performed with a cassette which is transported on a video deck and scanned in rubbing contact with a magnetic head as it is guided by guide poles and rollers. In order to improve the tape sensitivity, especially the output of video recording and playback in the high-frequency range, the tape must have a stable rubbing contact with the magnetic head, and to meet this requirement, the magnetic layer is finished to have a smooth surface. However, when the tape is transported on the video deck, both the obverse and reverse surfaces of the tape are abraded by the guide poles and rollers, and the good running property of the magnetic layer on the obverse surface does not ensure the absence of an excessive tension on the tape if the rubbing area of the reverse surface does not have good runnability. If an excessive tension is applied to the running tape, the magnetic layer is rubbed with the head so vigorously that the layer is damaged or magnetic particles shed from the layer. As a further disadvantage, varying pressures by which the tape is wound on a takeup reel cause uneven tape running during repeated operation. These defects are all harmful to video or electro-to-magnetic conversion characteristics and cause skew, jitter or reduced S/N.

In order to avoid these problems, a backcost is usually provided on the reverse surface of magnetic tape. While various methods are used to improve the ability of the back-coat to run smoothly in contact with guide poles and rollers, a typical technique is by incorporating inorganic particles in a resin layer. The essence of this technique lies in roughening the surface of the backcoat so that it has a reduced area of contact, hence a smaller coefficient of friction, with guide poles and rollers. The use of inorganic particles in a resin layer are taught in many prior art patents such as Japanese Patent Application (OPI) Nos. 13034/1982, 161135/1983, 53825/1982 and 2415/1983 (the symbol OPI as used herein means an unexamined published Japanese patent application). Most of these patents specify the size of the inorganic particles used; for example, Japanese Patent Application (OPI) No. 130234/1982 shows using inorganic particles having an average size of 0.02–0.5 $\mu$m to provide a backcoat having such a surface roughness that the center-line-average roughness, Ra, is not more than 0.024 $\mu$m for a cut-off value of 0.08 $\mu$m. Japanese Patent Application (OPI) No. 161135/1983 shows the use of similar inorganic particles except that Ra of the resulting overcoat is 0.025–0.1 $\mu$m.

However, even the use of inorganic particles in the prior art is not able to provide sufficient running property and prevent the occurrence of excessive tension on the running tape. Furthermore, the surface of the backcoat is damaged as a result of cyclic use of the magnetic tape. These defects are presumably due to the high frictional coefficient of the surface of the backcoat, which not only increases the frictional resistance of the tape but also causes the resultant increase in the force of rubbing the backcoat, thereby making it sensitive to undesired surface abrasion.

If the backcoat does not have good running property or durability, the magnetic tape is unable to run smoothly on a tape deck and the electro-to-magnetic conversion characteristics mentioned above the magnetic layer may be impaired. With the recent introduction of portable, compact and high-density recording VHS or beta-video movies, the practice of video tape recording has expanded to outdoor locations, and the development of magnetic tape adapted to such applications is desired. To this end, more rigorous requirements must be met. First, compact and high-density video equipment has a complex tape transport path and the magnetic tape is brought into rubbing contact with guide poles and rollers at many points, and therefore, the tape is required to have a high resistance to abrasion. Secondly, a hot and humid atmosphere may occur in the outdoor application, so the tape is also required to have high resistance to such hostile conditions. In short, magnetic tape adapted to use with compact and high-density video recording equipment must have more-than-usual running property, resistance to shedding, and durability.

The conventional backcoat uses inorganic particles having an average size in the range of 0.02–0.5 $\mu$m and it has various problems to be solved before it can be applied to the magnetic tape adapted to compact and high-density video recording equipment.

SUMMARY OF THE INVENTION

One object of the present invention is to provide a magnetic recording medium having a durable backcoat which withstands cyclic use.

Another object of the present invention is to provide a magnetic recording medium having a backcoat which ensures smooth running and a picture of high quality.

A further object of the present invention is to provide a magnetic recording medium having a backcoat that renders the magnetic layer durable without causing excessive tension during tape transport.

The present invention provides a magnetic recording medium having a magnetic layer on one side of a support and a backcoat on the other side which contains a nonmagnetic powder and a binder resin, characterized in that the non-magnetic powder comprises particles having an average size greater than 0.5 $\mu$m and smaller than 2.0 $\mu$m and a maximum size of not more than 5 $\mu$m.

DETAILED DESCRIPTION OF THE INVENTION

The backcoat according to the present invention contains a binder resin and a non-magnetic powder comprising particles having an average size greater than 0.5 $\mu$m and smaller than 2.0 $\mu$m. Particles having an average size of 0.5 $\mu$m or less are usable to provide a backcoat having improved running property and durability. Particles having an average size of 2.0 $\mu$m or more are also not desired since a magnetic recording medium, say tape, having a backcoat prepared from such particles has a great likelihood of damaging the magnetic coat of an adjacent tape layer when the tape is wound on a takeup reel. Furthermore, the uneven surface of the backcoat of one tape layer is transferred onto the magnetic coat of an adjacent layer, impairing the S/N of that magnetic coat.

The non-magnetic powder according to the present invention preferably has a narrow particle size distribution, and the proportion of the particles having a size of 3 μm or larger is preferably not more than 20 wt% of all the particles. The backcoat containing such non-magnetic particles preferably have a center-line-average roughness (Ra) of 0.015-0.040 μm for a cut-off value of 0.08 mm. A backcoat having Ra of less than 0.015 μm is poor in running property and durability. A backcoat having Ra exceeding 0.040 μm causes adverse effects on the backcoat of the type described above. A backcoat having a maximum surface roughness (Rmax) of 5 μm or less is preferred, with the range of 0.15-0.65 μm being more preferred. A backcoat whose Rmax is more than 0.65 μm causes undesired effects on the magnetic layer.

Given the average particle size and surface roughness within the ranges specified above, the non-magnetic powder according to the present invention preferably has a dynamic friction coefficient of 0.1-0.5.

According to the present invention, the non-magnetic powder defined above is incorporated in the backcoat together with a binder resin of the type described later in this specification. In order to realize the center-line-average roughness (Ra) and dynamic frictional coefficient specified above, the non-magnetic powder is preferably used in an amount of 5-60 wt%, more preferably 15-40 wt%, of the backcoat.

The average particle size, Ra and dynamic friction coefficient of the non-magnetic powder also depend on the hardness of the magnetic layer. If the magnetic layer has a sufficient hardness to avoid the transfer of the uneven surface of the backcoat of an adjacent tape layer, relatively large average particle sizes and Ra values may be selected without causing a significant increase in the dynamic friction coefficient.

The backcoat according to the present invention preferably has a thickness of 0.1-1.5 μm.

The non-magnetic powder suitable for use in the present invention is made of silicon oxide, titanium oxide, titanium dioxide, aluminum oxide, chromium dioxide, silicon carbide, calcium carbide, boron nitride, zinc fluoride, zinc oxide, molybdenum dioxide, calcium carbonate or barium sulfate. Calcium carbonate and titanium oxide are preferred. Also usable are organic powders such as fluorine resin powder (e.g. polytetrafluoroethylene), melamine resin powder (e.g. benzoguanamine) and organic molybdenum resin powder.

According to the present invention, a binder resin is incorporated in the backcoat together with the non-magnetic powder shown above. The binder resin is selected from among thermoplastic resins, thermosetting resins, reactive resins, and resins curable upon irradiation with electron beam, as well as mixtures thereof.

Suitable thermoplastic resins have a softening point of less than 150° C., an average molecular weight of about 10,000 to 200,000, and a degree of polymerization of about 200 to 2000. Examples of such polymers are vinyl chloride/vinyl acetate/vinyl alcohol copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, poly(vinyl fluoride), vinylidene chloride/acrylonitrile copolymer, butadiene/acrylonitrile copolymer, polyamide resin, polyvinyl butyral, cellulose derivatives (e.g. cellulose acetate butyrate, cellulose diacetate, cellulose triacetate, cellulose propionate and nitrocellulose), styrene/butadiene copolymer, polyester resin, chlorovinyl ether/acrylic acid ester copolymer, amino resins, various synthetic rubber thermoplastic resins and mixtures thereof.

These thermoplastic resins are shown in Japanese Patent Publication Nos. 6877/1962, 12528/1964, 19282/1964, 5349/1965, 20907/1965, 9463/1966, 14059/1966, 19685/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, as well as U.S. Pat. Nos. 3,144,352, 3,419,420, 3,499,789, and 3,713,887.

The thermosetting or reactive resin is such that it has a molecular weight of less than 200,000 when it is in coating solution and that after application and drying of a coating solution, it comes out of solution due to condensation, addition or other reactions. Preferred thermosetting or reactive resins are those which do not soften or melt until they are decomposed with heat. Specific examples are phenolic resins, phenoxy resins, epoxy resins, polyurethane resin curable resins, urea resin, melamine resin, alkyd resin, silicone resin, acrylic reactive resin, vinyl chloride/vinyl acetate resin, a mixture of high-molecular weight polyester resin and isocyanate prepolymer, a mixture of methacrylic acid salt copolymer and diisocyanate prepolymer, urea-formaldehyde resin, a mixture of polyester polyol and isocyanate, polycarbonate type polyurethane, polyamide resin, a mixture of low-molecular weight glycol, high-molecular weight diol and triphenylmethane triisocyanate, polyamide resins and mixtures thereof.

These thermosetting and reactive resins are shown in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22067/1972, 22072/1972, 22073/1972, 28045/1972, 28048/1972, 28922/1972 and 4051/1983, Japanese Patent Application (OPI) Nos. 31919/1982 and 60430/1983; Japanese Patent Application Nos. 151964/1983, 120697/1983 and 120698/1983; as well as U.S. Pat. Nos. 3,144,353, 3,320,090, 3,437,510, 3,597,273, 3,781,210 and 3,731,211.

Illustrative resins that cure upon irradiation with electron beams include unsaturated prepolymers such as maleic anhydride type, urethane acrylic type, polyester acrylic type, polyether acrylic type, polyurethane acrylic type and polyamide acrylic type, as well as polyfunctional monomers such as ether acrylic type, urethane acrylic type, phosphate ester type, aryl type and hydrocarbon type.

Various phenoxy resins can be used as binders in the backcoat on the magnetic recording medium of the present invention, and the following are preferred for the purpose of providing improved keeping quality and wear resistance: STX-04 (hydrogenated type of Toto Kasei K.K.), STX-05 (covalent bond type of Toto Kasei K.K.), and PKHH (product of Union Carbide Corporation).

Suitable epoxy resins that may be used as binders are listed below: Araldite 6084 (bisphenol A type of Ciba-Geigy Corporation with an average molecular weight of 1740-2050), Araldite 6099 (bisphenol A type of Ciba-Geigy Corporation with an average molecular weight of 4800-8000), ECN-1273 (novolak type of Ciba-Geigy Corporation, with an average molecular weight of 1080), Epikote 834 (bisphenol A type of Shell Chemical Co., Ltd., with an average molecular weight of 470), Epikote 1004 (bisphenol A type of Shell Chemical Co., with an average molecular weight of 1600), Epikote 1007 (bisphenol A type of Shell Chemical Co., with an average molecular weight of 2900), EP-4080 (hydrogenated bisphenol A type of Asahi Denki Kasei K.K.) and EPV-6 (urethane-modified type of Asahi Denki Kasei K.K.).

The above listed phenoxy and epoxy resins may be used either individually or in combination.

The following polyurethane resins may be used as binders in the backcoat of the magnetic recording medium of the present invention: Acrethane (acrylic urethane of Fujikura Kasei Co., Ltd.), Sofrannate MS-23 (product of The Tokyo Rubber Industry Co., Ltd.), PS-706 (hard type urethane resin of Mitsui-Nisso Urethane Co., Ltd.), PS-815 (hard type urethane resin of Mitsui-Nisso Urethane Co., Ltd.), MAU-2010 (product of Dainichi Seika Color & Chemicals Mfg. Co., Ltd.), N-3022 (product of Nippon Polyurethane Industry Co., Ltd.), DN-3985 (product of Nippon Polyurethane Industry Co., Ltd.), Estan 5701 (product of B. F. Good Rich Chemicals Co.), and PANDEX 78-8 (product of Dainippon Ink and Chemicals, Inc.).

In order to have further improved durability, the backcoat of the magnetic recording medium according to the present invention may contain various curing agents such as isocyanates. Illustrative aromatic polyisocyanates include tolylene diisocyanate (TDI), 4,4'-diphenylmethane diisocyanate (MDI), xylylene diisocyanate (XDI), metaxylylene diisocyanate (MXDI), as well as adducts of these isocyanates with active hydrogen containing compounds. These aromatic diisocyanates preferably have average molecular weights in the range of 100 to 3,000. Commercially available aromatic diisocyanates include Sumidyl T 80, 44 S, PF and L, as well as Desmodur T 65, 15, R, RF, IL and SL (products of Sumitomo Bayer Urethane K.K.); Takenate 300 S and 500 (products of Takeda Chemical Industries, Ltd.); "NDI" and "TODI" (products of Mitsui Nisso Urethane Co., Ltd.); Desmodur T 100, Millionate MR and MT, and Collonate L (products of Nippon Polyurethane Industry Co., Ltd.); PAPI-135, TD 165, 80, 100, and Isonate 125M and 1431 (products of Kasei-Upjohn K.K.).

Illustrative aliphatic isocyanates include hexamethylene diisocyanate (HMDI), lysine isocyanate, trimethyl hexamethylene diisocyanate (THDI), and adducts of these isocyanates with active hydrogen containing compounds. Preferred aliphatic isocyanates and their adducts with active hydrogen containing compounds are those which have molecular weights in the range of 100 to 3,000. Particularly preferred aliphatic isocyanates are non-alicyclic isocyanates and their adducts with active hydrogen containing compounds.

Commercially available aliphatic isocyanates are Sumidyl N and Desmodur Z 4273 (products of Sumitomo-Bayer Urethane K.K.); Duranate 50M, 24 A-100, and 24 A-90 CX (products of Asahi Chemical Industry Co., Ltd.); Collonate HL (product of Nippon Polyurethane Industry Co., Ltd.); and TMD 1 produced by Hills Corporation. Illustrative non-alicyclic isocyanates are methyl cyclohexane-2,4-diisocyanate of the following formula:

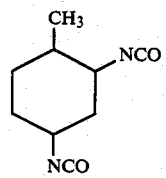

4,4'-methylene bis(cyclohexylisocyanate) of the following formula:

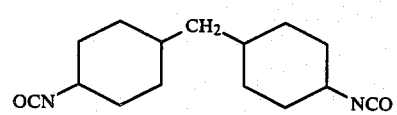

isophorone diisocyanate, and adducts of these aliphatic isocyanates with active hydrogen containing compounds. Commercially available non-alicyclic isocyanates are "IPDI", "IPDI-T1890", "IPDI-H 2921" and "IPDI-B 1065" (products of Hüls). Other usable polyisocyanates are adducts of diisocyanates and triols, pentamers of diisocyanates and decarbonized products obtained by reacting 3 mols of diisocyanate with water. Illustrative examples include an adduct of 3 mols of tolylene diisocyanate and 1 mol of trimethylolpropane, an adduct of 3 mols of metaxylylene diisocyanate and 1 mol of trimethylolpropane, pentamers of tolylene diisocyanate, and pentamers of 3 mols of tolylene diisocyanate and 2 mols of hexamethylene diisocyanate. All of these polyisocyanates are easily available in the industry. For providing a backcoat of good film properties, an aromatic isocyanate is preferably used in combination with an aliphatic isocyanate.

A backcoat for the magnetic recording medium of the present invention may be formed from the isocyanates shown above by the following procedure: first, a binder resin selected from among those listed above, and an optional additive (to be described later in this specification) are dispersed in an organic solvent to prepare a paint composition, and after adding a suitable isocyanate (preferably the combination of aromatic and aliphatic isocyanates), the mixture is applied to a support such as a polyester film, and the web is dried as required. The isocyanate is preferably used in an amount of 5-50 wt% of the binder. If the amount of the isocyanate is less than 5 wt% of the binder, a sufficiently hardened backcoat film is not obtained. If the amount of the isocyanate is more than 50 wt% of the binder, an undesirably too hard backcoat film results. A particularly preferred range for the amount of the isocyanate is from 5 to 25 wt% of the binder.

The paint from which the backcoat is prepared may contain various additives such as a dispersant, a lubricant and an antistat.

Examples of the dispersant are aliphatic acids having 8 to 18 carbon atoms (RCOOH wherein R is a saturated or unsaturated alkyl group having 7 to 17 carbon atoms) such as caprylic acid, capric acid, lauric acid, myristic acid, palmitic acid, stearic acid, oleic acid, elaidic acid, linoleic acid, and linolenic acid. Metal soaps made of alkali metals (Li, Na, K, etc.) or alkaline earth metals (Mg, Ca, Ba, etc.) of these aliphatic acids, as well as lecithin may also be used as the dispersant. Higher alcohols having 12 or more carbon atoms, as well as sulfate esters of these alcohols are also usable. Also usable are commercial surfactants. These dispersants and those listed above may be used either individually or in admixture.

Suitable lubricants include silicone oil, graphite, molybdenum disulfide, tungsten disulfide, aliphatic acid esters made of monobasic acids having 12–16 carbon atoms and monovalent alcohols having 3–12 carbon atoms, and aliphatic acid esters made of monobasic acids having 17 or more carbon atoms and monovalent alcohols having a total of 21–23 carbon atoms as combined with the carbon atoms in the monobasic aliphatic acids. These lubricants are used in an amount of 0.2–20 parts by weight for 100 parts by weight of the binder.

Suitable antistats include conductive powders such as carbon black, graphite, tin oxide-antimony oxide compounds, titanium oxide-tin oxide-antimony oxide compounds, and carbon black graft polymers; natural surfactants such as saponin; nonionic surfactants such as alkylene oxides, glycerins and glycidols; cationic surfactants such as heterocyclic compounds (e.g. pyridine), phosphonium and sulfonium compounds; anionic surfactants containing acidic groups such as carboxylic acid, sulfonic acid, phosphoric acid, sulfuric acid ester group or phosphoric acid ester group; amphoteric surfactants such as amino acids, aminosulfonic acids, and sulfate or phosphate esters of aminoalcohol.

Among these antistats, carbon black is particularly preferred. Carbon black is preferably used in such an amount that its weight ratio to the non-magnetic powder ranges from 15/1 to 1/5, more preferably from 6/1 to ½.

Various solvents may be used for preparing a magnetic paint or as an aid to the application of the magnetic paint. Suitable solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate, and ethylene glycol mono-acetate; ethers such as glycol dimethyl ether, glycol monoethyl ether, dioxane and tetrahydrofuran; aromatic hydrocarbons such as benzene, toluene and xylene; halogenated hydrocarbons such as methylene chloride, ethylene chloride, carbon tetrachloride, chloroform, and dichlorobenzene.

Suitable materials for the base include polyesters such as poly(ethylene terephthalate) and poly(ethylene-2,6-naphthalate); polyolefins such as polypropylene; cellulose derivatives such as cellulose triacetate and diacetate; plastics such as polyamide and polycarbonate; metals such as copper, aluminum, and zinc; and ceramics such as glass, boron nitride, silicon carbide, china and japan.

The thickness of the base varies with their physical shape. For films and sheets, the thickness is between about 3 and 100 $\mu$m, preferably from 5 to 50 $\mu$m, for disks and cards, the thickness ranges from about 30 $\mu$m to 10 mm. The bases may be in a cylindrical drum shape whose specific configuration is determined by the type of the recorder with which the magnetic recording medium of the present invention is used.

An intermediate layer may be disposed between the base and the backcoat for the purpose of providing good adhesion between them.

A backcoat may be applied from the paint composition onto the base, and application techniques that can be used include air doctor coating, blade coating, air knife coating, squeeze coating, impregnate coating, reverse roll coating, transfer roll coating, gravure coating, kiss coating, cast coating, and spray coating.

The magnetic layer of the recording medium according to the present invention may include a binder resin, dispersant, antistat and lubricant of the same type as incorporated in the backcoat. These non-magnetic materials are used in a total amount of 5 to 70 parts by weight for 100 parts by weight of a magnetic powder. Various ferromagnetic powders may be used as the magnetic powder, and they include iron oxides such as $\gamma$-Fe$_2$O$_2$O$_3$, Co-containing $\gamma$-Fe$_2$O$_3$, Co-doped $\gamma$-Fe$_2$O$_3$, Fe$_3$O$_4$, Co-contaning Fe$_3$O$_4$ and CrO$_2$; and metallic particles mainly composed of metals such as Fe, Ni and Co, or alloys such as Fe-Ni-Co, Fe-Mn-Zn, Fe-Ni-Zn, Fe-Co-Ni-Cr, Fe-Co-Ni-P, and Co-Ni.

Common abrasives may be incorporated in the magnetic layer, and they include fused alumina, silicon carbide, chromium oxide, corundum, artificial corundum, diamond, artificial diamond, garnet, emery (main components: corundum and magnetite), and titanium oxide. These abrasives have an average particle size of 0.05 to 5$\mu$, and a 0.1 to 1$\mu$ range is particularly preferred. They are used in an amount of 1 to 20 parts by weight per 100 parts by weight of the magnetic particles. The magnetic layer may be prepared by using the same coating solvent and techniques as those employed for providing the backcoat.

The magnetic recording medium of the present invention is completed by forming the backcoat on that side of the base which is opposite the side where the magnetic layer is formed. The completed recording medium is slit to a given length for use with video equipment. Since the backcoat contains non-magnetic particles having an average size greater than 0.5 $\mu$m but less than 2.0 $\mu$m and a maximum size of not more than 5 $\mu$m, the recording medium which is typically in a tape form has improved running property and durability; these good characteristics are not impaired even when the recording medium is put in a hot and humid atmosphere for outdoor applications. A probable reason is that when the backcoat is in contact with, for example, a guide pole, the plane of contact is principally provided by the non-magnetic particles, and the layer of binder resin which is sensitive to temperature and humidity is sufficiently distant from the contact plane to avoid any adverse effects on the performance of the backcoat. By dispersing relatively large non-magnetic particles less densely in the binder resin, a backcoat having a coarser surface for the same non-magnetic powder content can be obtained than when smaller particles are densely dispersed in the binder resin. As a result, the backcoat has improved running property and durability with respect to guide poles or rollers with which the backcoat is put into contact.

As will be understood from the foregoing description, the backcoat according to the present invention which contains non-magnetic particles having an average size greater than 0.5 $\mu$m but smaller than 2.0 $\mu$m and a maximum size of not more than 5 $\mu$m has a reduced frictional coefficient which improves not only the durability of the backcoat but also the runnability of a magnetic recording medium, say, magnetic tape using that backcoat. As a result, the tape will not be placed under excessive tension due to the backcoat, and this is effective not only in rendering the magnetic layer durable but also in producing a picture of good quality. These advantages of the backcoat according to the present invention are maintained even outdoors under hostile climate conditions.

The present invention is hereunder described in greater detail by reference to working examples, but it should be understood that the scope of the invention is by no means limited to the following examples.

BTH ½ of Asahi Chemical Industry Co., Ltd.; "isocyanate" was Collonate L of Nippon Polyurethane Industry Co., Ltd.; and "calcium carbonate" was a product of Shiraishi Kogyo K.K. having the average particle size put in parentheses.

TABLE 1

|  | Example 1 | Example 2 | Comparative Example 1 | Comparative Example 2 | Comparative Example 3 | Comparative Example 4 |
| --- | --- | --- | --- | --- | --- | --- |
| Polyester | 41.6 | 41.6 | 41.6 | 41.6 | 41.6 | 41.6 |
| Nitrocellulose | 41.6 | 41.6 | 41.6 | 41.6 | 41.6 | 41.6 |
| Polyisocyanate | 16.7 | 16.7 | 16.7 | 16.7 | 16.7 | 16.7 |
| Methylethyl Ketone (MEK) | 1260 | 1260 | 1260 | 1260 | 1260 | 1260 |
| Toluene | 540 | 540 | 540 | 540 | 540 | 540 |
| Calcium Carbonate (Average particle size in μm) | 17.6 (1.5) | — | 17.6 (0.4) | — | 17.6 (2.5) | — |
| Titanium Oxide (Average particle size in μm) | — | 17.6 (1.5) | — | 17.6 (0.4) | — | 17.6 (2.5) |

EXAMPLE 1

A magnetic layer was formed on a polyethylene terephthalate base by the following procedure. An iron-base magnetic powder (130 g) and alumina (6 g) were added to a solution of phenoxy resin (4 g) in cyclohexanone (250 g). The mixture was agitated in a sand mill for 4 hours until a uniform dispersion was formed. The dispersion was mixed with a solution of polyurethane (10 g), butyl stearate (0.05 g) and myristic acid (0.1 g) in a mixed solvent of cyclohexanone (10 g) and tetrahydrofuran (100 g). The mixture was agitated in the sand mill for 1 hour to obtain a uniform dispersion. A curing agent (Collonate L, 3 g) was added to the dispersion and the mixture was agitated to form a paint composition. The paint was applied to a polyethylene terephthalate base film in an oriented magnetic field, and the web with a magnetic coat was subsequently dried.

The components shown in Table 1 except for polyisocyanate were mixed in a ball mill for 5 hours until a coating solution was formed. Thereafter, polyisocyanate was added to the solution, which was then stirred and applied to the back side of the base by gravure coating, and the web was subsequently dried to form a backcoat in a dry thickness of 1.3 μm. The resulting product was slit to magnetic tape samples ½ wide.

EXAMPLE 2

Magnetic tape samples were prepared as in Example 1 except that the composition for the backcoat was changed to what is indicated in Table 1 under the column of Example 2.

COMPARATIVE EXAMPLE 1

Magnetic tape samples were prepared as in Example 1 except that the composition for the backcoat was changed to what is indicated in Table 1 under the column of Comparative Example 1.

COMPARATIVE EXAMPLES 2 TO 4

Magnetic tape samples were prepared as in Example 1 except that the composition for the backcoat was changed to what are indicated in Table 1 under the columns of Comparative Examples 2 to 4.

The numerals in Table 1, refer to the parts by weight of the respective components. "Polyester" was Vylon 200 of Toyobo Co., Ltd.; "nitrocellulose" was Celnoba

EXAMPLE 3

The components listed below were mixed in a ball mill for 48 hr to form a uniform dispersion. After adding 3 parts of an isocyanate, the dispersion was passed through a filter having an average pore size of 1 μm to prepare a paint composition.

| Components | Amount (parts) |
| --- | --- |
| Co-doped γ-Fe$_2$O$_3$ (aspect ratio: 10, length of particle: 0.25 μm) | 100 |
| Vinyl chloride/vinyl acetate copolymer (Vinylite VAGH of Union Carbide Corporation) | 4 |
| Polyurethane (Eastan 5701 Fl. of B. F. Goodrich Chemical Co.) | 16 |
| Myristic acid | 2 |
| Methyl ethyl ketone | 200 |
| Toluene | 170 |

The paint was applied to a polyethylene terephthalate base film 12 μm thick in an oriented magnetic field to give a dry thickness of 4 μm, and the web with a magnetic coat was subsequently dried. The dried magnetic coat was smoothed by passage through calender rolls.

The components shown in Table 2 under the column of Example 3 were mixed in a ball mill for 48 hours until a uniform dispersion formed. Twenty parts of an isocyanate were added as a curing agent to prepare a coating solution, from which a backcoat was applied in a dry thickness of 0.8 μm to the back side of the terephthalate base by reverse roll coating. The web was dried and slit to magnetic tape samples ½ inch wide.

EXAMPLE 4

Magnetic tape samples were prepared as in Example 3 except that the composition for the backcoat was changed to what is indicated in Table 2 under the column of Example 4.

EXAMPLE 5

A Co-Ni (20 wt% Ni) magnetic film (0.1 μm thick) was deposited by oblique evaporation on a polyethylene terephthalate film base (10 μm thick). A lubricant film (0.01 μm) was formed on the magnetic coat. Subsequently, a backcoat was formed on the back side of the base from the composition shown in Table 2 under the column of Example 5. The web was slit to magnetic tape samples ½ inch wide.

COMPARATIVE EXAMPLE 5

Magnetic tape samples were prepared as in Example 3 except that the composition for the backcoat was changed to what is indicated in Table 2 under the column of Comparative Example 5.

COMPARATIVE EXAMPLE 6

Magnetic tape samples were prepared as in Example 3 except that the composition for the backcoat was changed to what is indicated in Table 2 under the column of Comparative Example 6.

A surface roughness meter produced by Tokyo Precision Instrument Co., Ltd. was used.

Skew analysis:

Each sample that had recorded color-bar signals was passed through a video deck 100 times at 30° C. and 80% r.h. The amount of image distortion on a monitoring screen at track switching positions was indicated in microseconds.

Jitter analysis:

Each sample was passed through a VTR jitter meter (product of Meguro Electronics Co., Ltd.) 100 times at 30° C. and 80% r.h. The amount of jitter with the sample was indicated in microseconds.

TABLE 3

|  | Ex. 1 | Ex. 2 | Comp. Ex. 1 | Comp. Ex. 2 | Comp. Ex. 3 | Comp. Ex. 4 | Ex. 3 | Ex. 4 | Ex. 5 | Comp. Ex. 5 | Comp. Ex. 6 |
|---|---|---|---|---|---|---|---|---|---|---|---|
| Tape Wear | none | none | yes | yes | none | none | none | none | none | none | yes |
| Tape Damage | none | none | yes | yes | none | none | none | none | none | none | yes |
| Dynamic Friction Coefficient | 0.19 | 0.20 | 0.76 | 0.82 | 0.19 | 0.18 | 0.19 | 0.20 | 0.20 | 0.17 | 0.82 |
| Surface roughnes, Ra ($\mu$m) | 0.028 | 0.024 | 0.014 | 0.012 | 0.042 | 0.045 | 0.028 | 0.024 | 0.020 | 0.042 | 0.012 |
| Surface roughness, Rmax ($\mu$m) | 0.233 | 0.219 | 0.152 | 0.130 | 0.72 | 0.75 | 0.233 | 0.219 | 0.195 | 0.720 | 0.130 |
| Skew ($\mu$s) | 0.5 | 0.5 | 1.1 | 1.2 | 0.5 | 0.5 | 0.5 | 0.5 | 0.5 | 0.5 | 1.2 |
| Jitter ($\mu$s) | 0.08 | 0.08 | 0.13 | 0.12 | 0.08 | 0.08 | 0.08 | 0.08 | 0.08 | 0.08 | 0.13 |
| Chroma S/N (dB) | 0 | 0 | 0 | 0 | −3.5 | −3.5 | +3.5 | +3.5 | +1.5 | −3.0 | 0 |

TABLE 2

|  | Example 3 | Example 4 | Example 5 | Comparative Example 5 | Comparative Example 6 |
|---|---|---|---|---|---|
| Vinyl Chloride Acetate (VAGH) | 35 | 35 | 35 | 35 | 35 |
| Polyurethane (Estan 5701) | 35 | 35 | 35 | 35 | 35 |
| MEK | 1260 | 1260 | 1260 | 1260 | 1260 |
| Toluene | 540 | 540 | 540 | 540 | 540 |
| Calcium Carbonate (Average particle size in $\mu$m) | 17.6 (1.5) | — | — | 17.6 (2.5) | — |
| Titanium Oxide (Average particle size in $\mu$m) | — | 17.6 (1.5) | — | — | 17.6 (0.4) |
| Melamine Resin Powder (Average particle size in $\mu$m) | — | — | 17.6 (1.5) | — | — |
| Carbon Black (Conductex 975) | 40 | — | — | — | — |

The samples prepared in Examples 1 to 5 and Comparative Examples 1 to 6 were subjected to the following tests, the results of which are shown in Table 3.

Wear test:

Each sample was passed through a video deck (Model NV 6200 of Matsushita Electric Industrial Co., Ltd.) 100 times, and the surface of the backcoat was checked with an optical microscope. Shedding caused abrasion on the surface of the backcoat, so its extensiveness was used as a criterion for the tape wear.

Damage test:

Each sample was passed through the same video deck 100 times, and the surface of the backcoat was checked visually. An abnormally great tension on the tape caused significant damage to the backcoat.

Dynamic friction test:

The dynamic friction coefficient of each sample was measured with a rotary surface tester (product of Shinto Scientific Co., Ltd.) using a 4 mm$\phi$ rod. The test conditions were as follows: load, 30 g and drum rotational number, 66.9 rpm.

Surface roughness measurement:

As is clear from Table 3, the backcoat of the present invention has a proper degree of surface roughness and, as compared with those of the comparative examples, has a superior electromagnetic property (running property represented by "skew" and "jitter"). Also, the tape is less in damage.

What is claimed is:

1. A magnetic recording medium comprising a support, a magnetic layer provided on one side of said support, and a backcoat provided on the other side of said support, wherein said backcoat comprises a binder resin and a non-magnetic powder, said binder resin being selected from the group consisting of polyurethane resin and nitrocellulose, said non-magnetic powder contained in an amount from 4–60% by weight of the total amount of components of said backcoat and having an average grain size of range of from 0.5 $\mu$m to 2 $\mu$m and a maximum grain size of not more than 5 $\mu$m and wherein the amount of non-magnetic powder having a grain size of more than 3 $\mu$m is less than 20% by weight of the total amount of said non-magnetic powder, said backcoat further containing an isocyanate as a hardener and said non-magnetic powder grains have an average center-line-average roughness ($R_a$) of 0.015 μm to 0.04 μm.

2. A magnetic recording medium according to claim 1, which has an intermediate layer provided in between said support and said backcoat.

3. A magnetic recording medium according to claim 1, wherein said backcoat has a thickness in the range of from 0.1 μm to 1.5 μm.

4. A magnetic recording medium according to claim 1, wherein said powder is in the range of from 15% to 40% by weight of the total amount of the components of said backcoat.

5. A magnetic recording medium according to claim 1, wherein said powder is selected from the group consisting of silicon oxide, titanium oxide, aluminum oxide, chromium oxide, silicon carbide, calcium carbide, boron nitride, zinc fluoride, molybdenum dioxide, calcium carbonate and barium sulfate.

6. A magnetic recording medium to claim 5, wherein said powder is either calcium carbonate or titanium oxide or a mixture thereof.

7. A magnetic recording medium according to claim 5, wherein said power is either calcium carbonate or titanium oxide or a mixture thereof.

8. A magnetic recording medium according to claim 5, wherein said powder is either calcium carbonate or titanium oxide or a mixture thereof.

9. A magnetic recording medium according to claim 1, wherein said backcoat further contains an antistatic agent.

10. A magnetic recording medium according to claim 9, wherein said antistatic agent is a carbon black.

11. A magnetic recording medium according to claim 1, wherein said backcoat contains both an aliphatic isocyanate and an aromatic isocyanate.

12. A magnetic recording medium according to claim 1, wherein said isocyanate is in the range of from 5% to 50% by weight of the binder resin in said backcoat.

13. A magnetic recording medium according to claim 12, wherein said isocyanate is in the range of from 5% to 25% by weight of said binder resin.

14. A magnetic recording medium according to claim 1, wherein said backcoat further contains a dispersant.

15. A magnetic recording medium according to claim 1, wherein said backcoat further contains a lubricant.

* * * * *